United States Patent [19]

McPheters

[11] Patent Number: 5,530,914
[45] Date of Patent: Jun. 25, 1996

[54] METHOD FOR DETERMINING WHEN A RADIO LEAVES A RADIO TALK GROUP

[75] Inventor: Laura L. McPheters, West Chicago, Ill.

[73] Assignee: Motorola, Inc., Schaumburg, Ill.

[21] Appl. No.: 290,162

[22] Filed: Aug. 15, 1994

[51] Int. Cl.⁶ ........................................ H04B 7/15
[52] U.S. Cl. .................... 455/34.1; 455/54.1; 455/15
[58] Field of Search .......................... 455/15, 16, 17, 455/32.1, 34.1, 34.2, 38.1, 38.2, 38.4, 51.1, 51.2, 53.1, 54.1, 54.2, 56.1, 62, 33.4, 63, 68, 67.7; 379/58, 59, 63; 370/110.1, 94.1; 340/825.08, 825.47

[56] References Cited

U.S. PATENT DOCUMENTS

| | | | |
|---|---|---|---|
| 3,671,865 | 6/1972 | Szumila et al. | 455/51.1 |
| 3,678,391 | 7/1972 | Gough | 455/38.2 |
| 4,692,945 | 9/1987 | Zdunek | 455/17 |
| 4,701,944 | 10/1987 | Howard et al. | 379/63 |
| 4,817,190 | 3/1989 | Comroe et al. | 455/56.1 |
| 5,014,345 | 5/1991 | Comroe et al. | 455/68 |
| 5,025,254 | 6/1991 | Hess | 379/63 |
| 5,054,110 | 10/1991 | Comroe et al. | 379/59 |
| 5,093,927 | 3/1992 | Shanley | 455/62 |
| 5,200,954 | 4/1993 | Teel, Jr. et al. | 455/33.1 |
| 5,265,262 | 11/1993 | Grube et al. | 455/56.1 |
| 5,279,521 | 1/1994 | Johlie et al. | 455/34.1 |
| 5,301,357 | 4/1994 | Thompson | 455/33.4 |
| 5,335,350 | 8/1994 | Felderman et al. | 455/54.2 |
| 5,369,783 | 11/1994 | Childress et al. | 455/56.1 |
| 5,422,883 | 6/1995 | Hauris et al. | 370/110.1 |

Primary Examiner—Andrew Faile
Attorney, Agent, or Firm—Susan L. Lukasik

[57] ABSTRACT

A method for determining when a radio leaves a radio talk group includes the step of notifying a radio(s), such as the initiator of the call (step 308), that one or more members of the talk group left the talk group. This information allows for the initiator of the call or another radio to re-transmit the call at a later date, or to attempt to get the missing radios back into the talk group prior to transmitting another call.

15 Claims, 3 Drawing Sheets

METHOD FOR DETERMINING WHEN A RADIO LEAVES A RADIO TALK GROUP

TECHNICAL FIELD

This invention relates in general to radio communication systems and more specifically to a method for determining when a radio leaves a radio talk group.

BACKGROUND

During a talk group call that is taking place in a trunked radio system, if a radio such as a key radio (e.g., a radio with highest priority or a radio critical to the call, etc.) is pulled away from the call by a dispatcher interrupt, going out of service, the radio switching talk groups in the middle of the conversation, etc., the initiator of the call does not have knowledge of this fact in present trunked systems. As a result, key or priority radios may miss part of the conversation without the originator of the talk group call knowing.

Another situation not currently addressed by current trunked radio systems is if a key radio is the initiator of a talk group call, and any of the radios in the talk group are pulled away from the call, the initiator of the call is not notified that the radio pulled away from the call is no longer participating in the talk group call. As a result, if the key initiator radio is communicating to all members of the talk group, the radio that is pulled away from the call will miss part of the conversation without the key initiator radio's knowledge. For example, when a talk group call is initiated by a priority radio, the user expects all parties in the talk group to be informed of the emergency at hand. If specific instructions are given, and one of the radios in the talk group leaves or is pulled away from the call, the user will miss the instructions. Therefore, the emergency situation may not be properly responded to since one or more radios in the talk group did not receive the emergency instructions and the priority or key initiator radio failed to be advised that some of the radios in the talk group were not in the group when the instructions were provided. A need thus exists for a method for initiator radios and/or key radios in a radio talk group to be informed if other key radios in the talk group are pulled away or leave the talk group during the talk group call.

DETAILED DESCRIPTION OF THE PREFERRED EMBODIMENT

Figure 1:
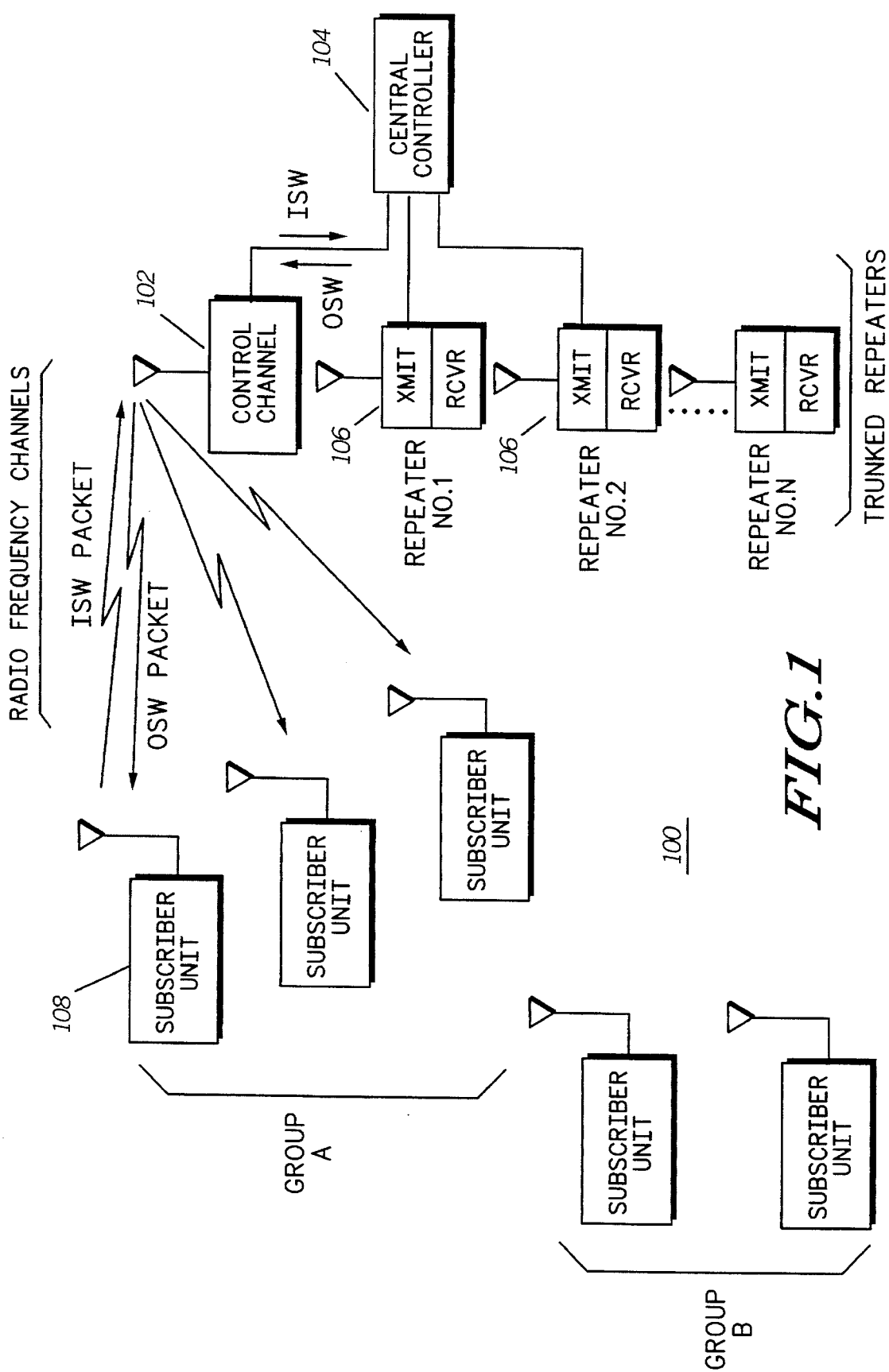
FIG. 1 is a block diagram of a trunked system in accordance with the invention.

In FIG. 1, a block diagram of a trunked communication system 100 is shown. The radios or subscriber units 108 which are part of system 100 communicate over control channel 102 with a control resource such as a system central controller 104 in order to receive status and control information from the central controller 104. The system central controller 104 acts as the system coordinator and is responsible for assigning radios to different repeaters 106 (channels) so that they may communicate amongst each other. The central controller 104 is also responsible for knowing where each of the radios are located (i.e. what voice channel) and for controlling other features typically found in a modern trunked communication system (e.g., handling phone patches, coordinating groups of radios in emergency situations, etc.).

The typical central controller 104 includes a main processing unit such as a computer with appropriate control software which controls the operation of controller 104. Also normally included as part of controller 104 is a video display and keyboard in order to allow the central control operator to communicate with the system. The signals which are sent from the central controller 104 to the subscriber units 108 over the control channel 102 are typically called outbound signaling words ("OSW's"). The control signals going from radios 108 to the central controller 104 are called inbound signaling words (ISW's). OSW's inform radios 108 when to change channels automatically so as to communicate with other members in the same radio talk group over an assigned voice channel 106 which has been assigned by the system central controller 104.

When requesting a channel 106 for a talk group call, the radio unit 108 sends in a single word group request (if affiliated) with its individual radio identification number. The central controller 104 generates a grant OSW for the talk group affiliated with the radio unit that transmitted the channel request by referencing a radio ID to talk group affiliation database residing in the central controller 104. If there is no talk group affiliation in the central controller database (e.g., due to corrupt data, etc.), the central 104 requests a dual word ISW from the radio unit which identifies the unit ID and the desired talk group. If the radio unit changes talk groups, or systems, it immediately begins to receive calls for the new talk group or system and preferably performs an auto affiliation sequence after being on the selected talk group for about 2 seconds. This typically includes transmitting an ISW that includes the unit's ID and new talk group information to controller 104. Controller 104 then updates its affiliation database accordingly.

If PTT (push to talk) is asserted before auto affiliation, the radio unit 108 sends in a dual word ISW identifying the unit's radio ID number and the new desired talk group affiliation. The central controller 104 will store the talk group information in the affiliation table and then if a voice channel 106 is available, it will generate a grant OSW for that talk group. The grant OSW is initially sent out as a dual word grant to identify the transmitting unit and the talk group number. The requesting radio 108 sees its individual and talk group IDs in the grant OSW and goes to the voice channel 106 as a transmitting radio. Any other subscriber units 108 which are currently operating in the same talk group also see the talk group ID in the grant OSW and move to the same voice channel 106 as receivers. After the dual OSW grant is sent out 4 times, subsequent assignment update OSWs are transmitted by the central controller 104 as single word OSWs with simply the talk group ID and the voice channel it is assigned to the particular talk group.

An example of a typical trunked conversation will begin by one radio 108 in group "A" pressing PTT which automatically sends an ISW over the control channel 102 to the central controller 104 requesting a voice channel 106 grant. Once the request comes in, central controller 104 decides which voice channel 106 to assign and transmits an OSW via control channel 102 back to the radios 108. The OSW will inform all radios 108 in group "A" to move to repeater No. 2 for example, at which point all the radios in group "A" will move to that repeater to begin their conversation. Some trunked radio communication systems do not use a central control channel, but embed the control information within the voice channels such as by sending the control information using low-speed data which does not affect the voice communication.

Figure 2:
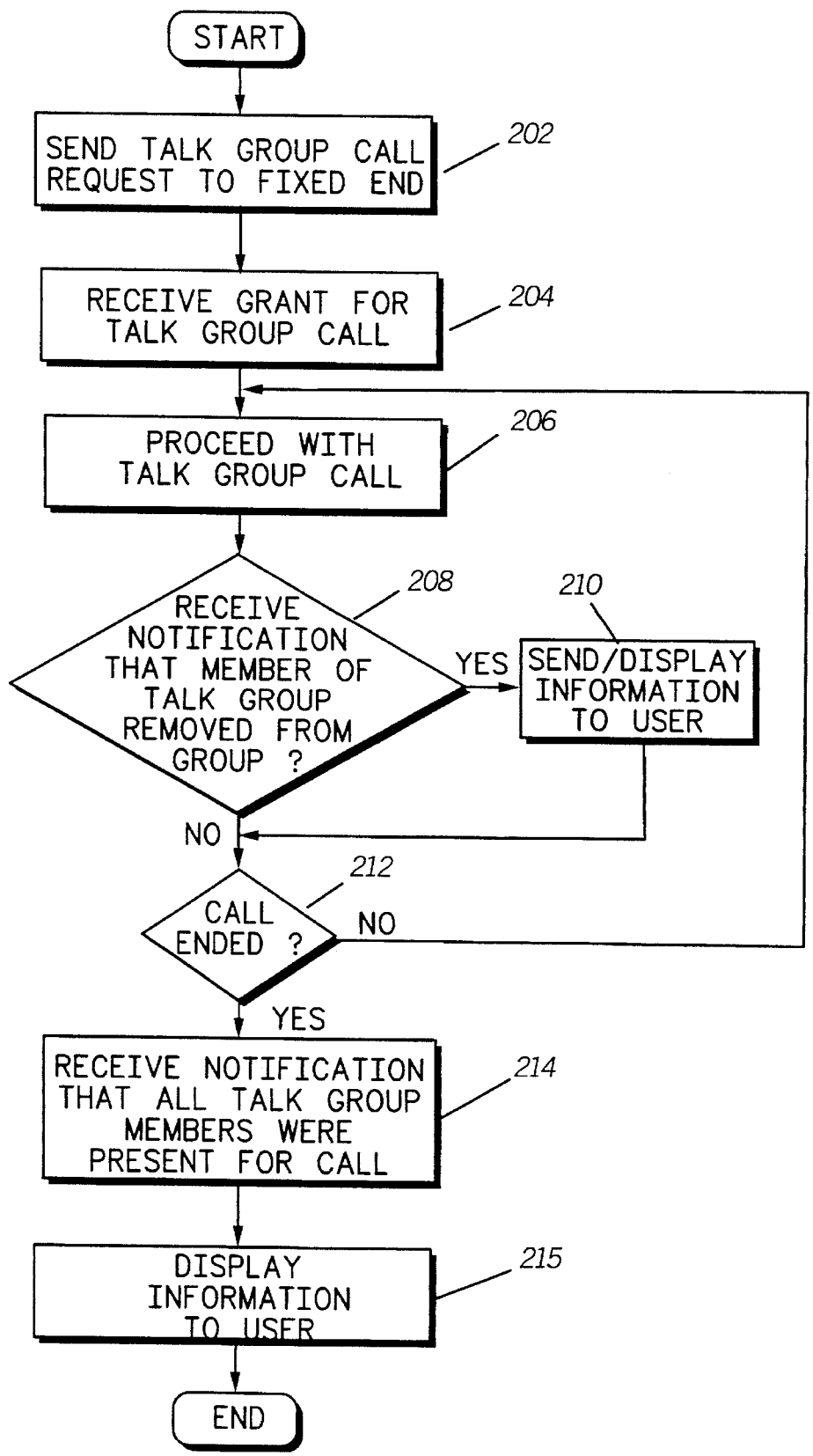
FIG. 2 is a flowchart showing the method at the radio end of determining when a radio from an established radio talk group leaves the talk group in accordance with the invention.

Referring now to FIG. 2, a flowchart showing the steps taken by one of the radios 108 in accordance with the preferred embodiment of the invention is shown. In step 202, the radio (for example a radio in talk group "A") transmits a talk group request to central controller 102. In step 204, the central controller grants the talk group call transmitting a talk group grant OSW informing the radios in talk group "A" which channel 106 to use for the talk group conversation. The radio commences the talk group call in step 206. If a radio in the talk group that is presently active, in this case talk group "A", decides to leave the talk group (e.g., radio user switches his talk group switch mode selector, radio user goes out of service, one of the radios in the talk group has to leave the talk group due to a priority interrupt transmission, etc.), the radio that leaves the talk group performs an auto affiliation routine after switching to the new group (e.g., talk group "B") after a predetermined period of time has elapsed (e.g., after a few seconds). This information comes in from the radio as an ISW which includes the radio identification number and the new talk group information. The central controller 104 upon receiving the information at step 208 from the radio updates its group affiliation data base which stores information on all the radios on the system and their current talk group affiliations. An auto affiliation routine is also performed by the radios when they leave service, leave a talk group due to a priority interrupt, etc.

In step 210, if a member of the ongoing talk group call leaves the talk group and subsequently notifies the central controller of its new talk group affiliation, the central controller generates an OSW which is sent to a key radio(s) in the talk group (or any other select unit or units in the talk group) which informs the key radio(s) that a particular radio has left the talk group. This information can be displayed at the radio and an audible alert such as a tone can be generated to alert the user of the departure. In an optional feature of the present invention, once the talk group call has ended in step 212, the key radio(s) receive an OSW that all members of the talk group were present during the call in step 214. This can be accomplished by central controller 104 making sure that any radios affiliated with the particular talk group did not leave the talk group between the call was started and when it ended. In step 215, the notification that all members of the talk group were present during the call is displayed at the radio and a tone can be generated to alert the user.

Figure 3:
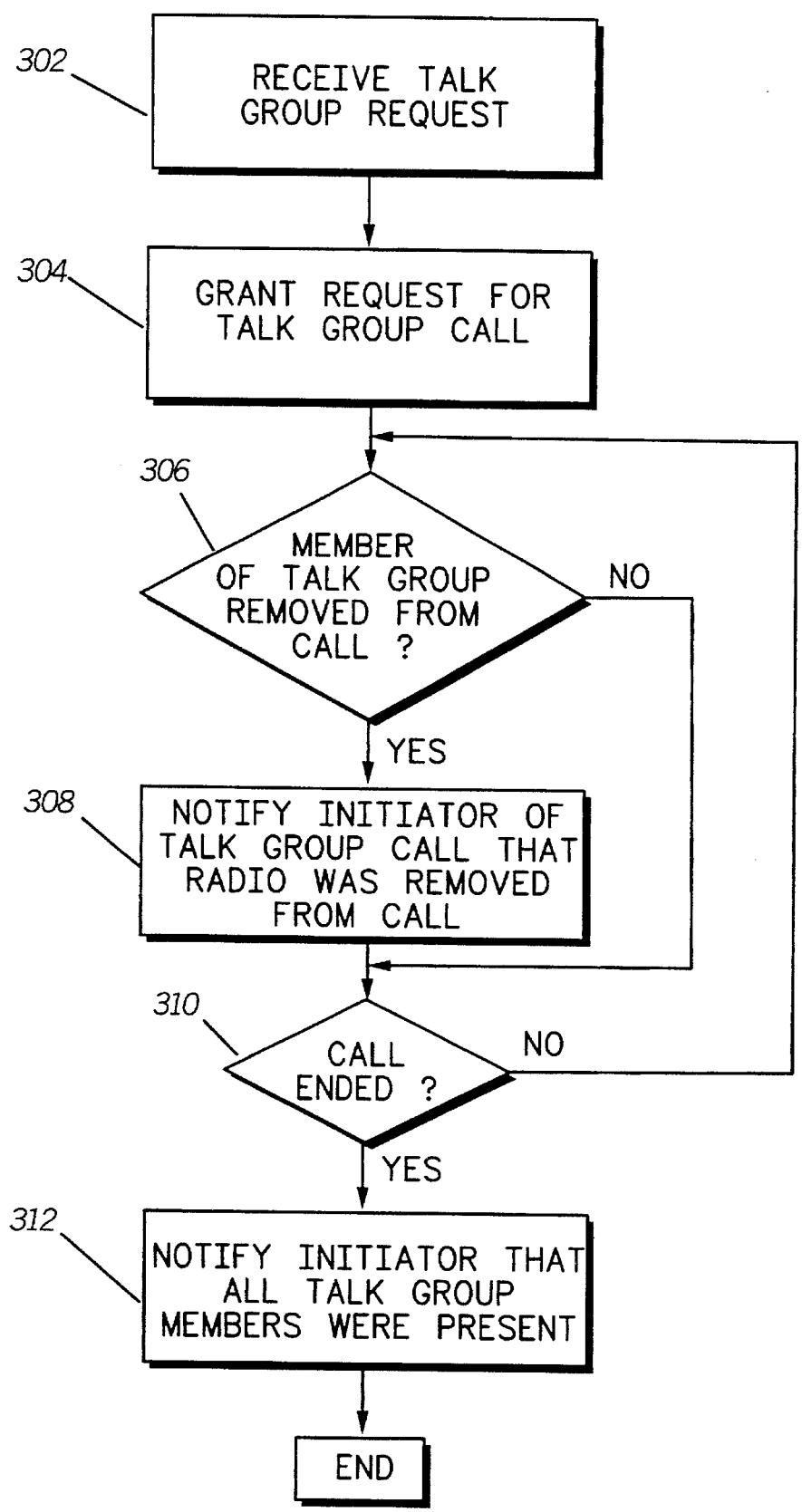
FIG. 3 is a flowchart showing the method from the fixed-end side of how the fixed-end provides a radio user with the information that a member of the radio talk group has left the group in accordance with the invention.

In FIG. 3, the steps taken by the central controller 104 in accordance with the invention are shown. In step 302, the central controller 104 receives a talk group call request from a radio 108 in the form of a channel request ISW. In step 304, if a channel 106 is available, the request is granted and the radios in the talk group are informed to which channel 106 to automatically switch to. In step 306, the central controller 104 monitors its affiliation data base to determine if any members of the current talk group are removed or leave the call and later send a new current affiliation to the central controller 104. If a talk group member leaves the talk group during the call, in step 308, central controller 104 transmits an information OSW to a key radio or radios in the talk group informing them that a radio was removed from the talk group. This information can also include information as to which radio in the group left. For example, the radio receiving the information can display the ID number of the radio which left the group. This can be accomplished by transmitting a one or more OSW's which include the above noted information. In the preferred embodiment, the information is sent to the radio that initiated the talk group call or to a designated key radio (e.g., supervisor radio user, etc.) in the talk group. In the case of the initiator radio the central controller 104 knows this by the ISW information transmitted by the radio. In the case the information is to be sent to a key radio, or radios, the information of which radios are to be designated a key can be pre-loaded into the central controller's database.

In step 310, it is determined if the talk group call has ended. In step 312, if all members of the talk group were present for the call, the initiator of the call or another key radio(s) in the talk group can be optionally notified of the fact that all radios were affiliated to the talk group during the duration of the call. The notification can be as simple as a confirmation tone, or a message being displayed at the radio.

Although the preferred embodiment of this invention has been discussed in relation to a trunked system having a central controller and a control channel in which to transmit and receive ISW's and OSW's, the present invention is not so limited. The invention can also be used in other trunked system which transmit control/data information on the same voice channel, on systems not having a dedicated control resource, but which use sophisticated ("smart") repeaters which act as control resources, and many other radio communication systems.

In summary, the present invention provides a method for initiator radios and/or key radios to be informed if other radios are pulled away from their talk group during the time the talk group call is taking place. When the initiator radio is done transmitting, the fixed end can inform the radio of the identification of the radio(s) that were pulled away from the call. If the system is a full duplex system, notification that a radio is no longer part of the call can occur while the initiator radio is transmitting. The invention allows the radio transmitting to decide whether to continue the call, issue a priority interrupt, re-initiate the call at a later time, etc. The added information provided by the present invention provides for added security that all radios that are to receive the talk group call information are in fact in position to receive the call.

What is claimed is:

1. A method for informing a radio of an initiator of a radio frequency (RF) talk group call involving a talk group in a trunked radio communication system having a control resource that one of the members of the talk group left the talk group during the RF talk group call, the method comprising the steps of:

receiving at the control resource a request for establishing a RF talk group call from the radio of the initiator of the RF talk group call;

granting the request for the RF talk group call;

determining during the RF talk group call if one or more of the members of the talk group leave the talk group during the time the RF talk group call is taking place; and notifying the radio of the initiator of the RF talk group call that one or more of the members of the talk group left the talk group.

2. A method as defined in claim 1, wherein the step of determining comprises the sub-step of:

receiving new talk group affiliation information at the control resource from the one or more radios which left the talk group during the time the RF talk group call is taking place.

3. A method as defined in claim 1, wherein the step of notifying comprises the sub-steps of:

transmitting a message to the radio of the initiator of the talk group call, the message including information on the one or more members of the talk group which left the talk group during the RF talk group call; and alerting the initiator of the RF talk group call when the message is received.

4. A method as defined in claim 1, wherein the step of notifying comprises the step of:

displaying at the radio of the initiator, information on the one or more radios which are members of the talk group which left the talk group during the RF talk group call.

5. A method as defined in claim 4, wherein the step of notifying further comprises the step of:

providing an audible alert at the radio of the initiator.

6. In a radio frequency (RF) communication system having a control resource and a plurality of radios affiliated with a radio talk group, a method for determining when a radio affiliated with the radio talk group leaves the radio talk group, the method comprising the steps of:

at the control resource:

determining if at least one radio of the plurality of radios affiliated with the radio talk group leaves the radio talk group during the time an RF talk group call is taking place; and transmitting a message to one or more of the plurality of radios affiliated with the radio talk group if the at least one radio of the plurality of radios affiliated with the RF talk group call leaves the radio talk group, the message informing the one or more of the plurality of radios that the at least one radio has left the radio talk group.

7. A method as defined in claim 6, wherein the step of determining comprises the step of:

monitoring to see if any of the plurality of affiliated radios affiliates with another talk group during the time the RF talk group call is taking place between the plurality of radios affiliated with the radio talk group.

8. A method as defined in claim 6, further comprising the steps of:

at the control resource:

determining when the RF talk group call is terminated; and transmitting a message to one or more of the plurality of radios affiliated with the radio talk group if none of the plurality of radios affiliated with the radio talk group left the radio talk group while the RF talk group call was taking place.

9. A method as defined in claim 6, further comprising:

receiving the message from the control resource at one or more of the plurality of radios affiliated with the radio talk group; and presenting the message at the one or more of the plurality of radios affiliated with the radio talk group.

10. A method as defined in claim 6, wherein the control resource transmits a message informing at least one of the plurality of radios that is affiliated with the radio talk group that all members of the radio talk group did not leave the talk group during the time the RF talk group call was taking place, if the control resource determines that none of the plurality of radios affiliated with the RF talk group call left the radio talk group during the time the RF talk group call was taking place.

11. A method as defined in claim 10, wherein the control resource transmits the message informing at least one of the plurality of radios that is affiliated with the radio talk group that all members of the radio talk group did not leave the radio talk group during the time the RF talk group call was taking place to the radio that initiated the RF talk group call.

12. The method of claim 1, further comprising the steps of:

at the control resource:

determining when the RF talk group call is terminated; and transmitting a message to the radio of the initiator of the RF talk group call if none of the members of the talk group left the talk group while the RF talk group call was taking place.

13. A method for informing a radio of an initiator of a radio frequency (RF) talk group call involving a talk group in a trunked radio communication system having a control resource that one of the members of the talk group left the talk group during the RF talk group call, the method comprising the steps of:

receiving at the control resource a request for establishing a RF talk group call from the radio of the initiator of the RF talk group call;

granting the request for the RF talk group call;

determining when the RF talk group call is terminated; and transmitting a message to the radio of the initiator of the RF talk group call if none of the members of the talk group left the talk group while the RF talk group call was taking place.

14. In a radio frequency (RF) communication system having a control resource and a plurality of radios affiliated with a talk group, a method comprising the steps of:

at the control resource:

determining if at least a radio of the plurality of radios affiliated with the talk group leaves the talk group during the time an RF talk group call is taking place;

determining when the RF talk group call is terminated; and when the RF talk group call is terminated, transmitting a message to at least one of the plurality of radios affiliated with the talk group if none of the plurality of radios affiliated with the talk group left the talk group while the RF talk group call was taking place, the message informing the at least one of the plurality of radios affiliated with the talk group that none of the plurality of radios affiliated with the talk group left the talk group while the RF talk group call was taking place.

15. The method of claim 14, further comprising the step of transmitting, either during or after the RF talk group call, a message to at least one of the plurality of radios affiliated with the talk group if at least one radio of the plurality of radios affiliated with the RF talk group call leaves the radio talk group while the RF talk group call was taking place, the message informing the at least one of the plurality of radios that the at least one radio left the radio talk group while the RF talk group call was taking place.

* * * * *